UNITED STATES PATENT OFFICE.

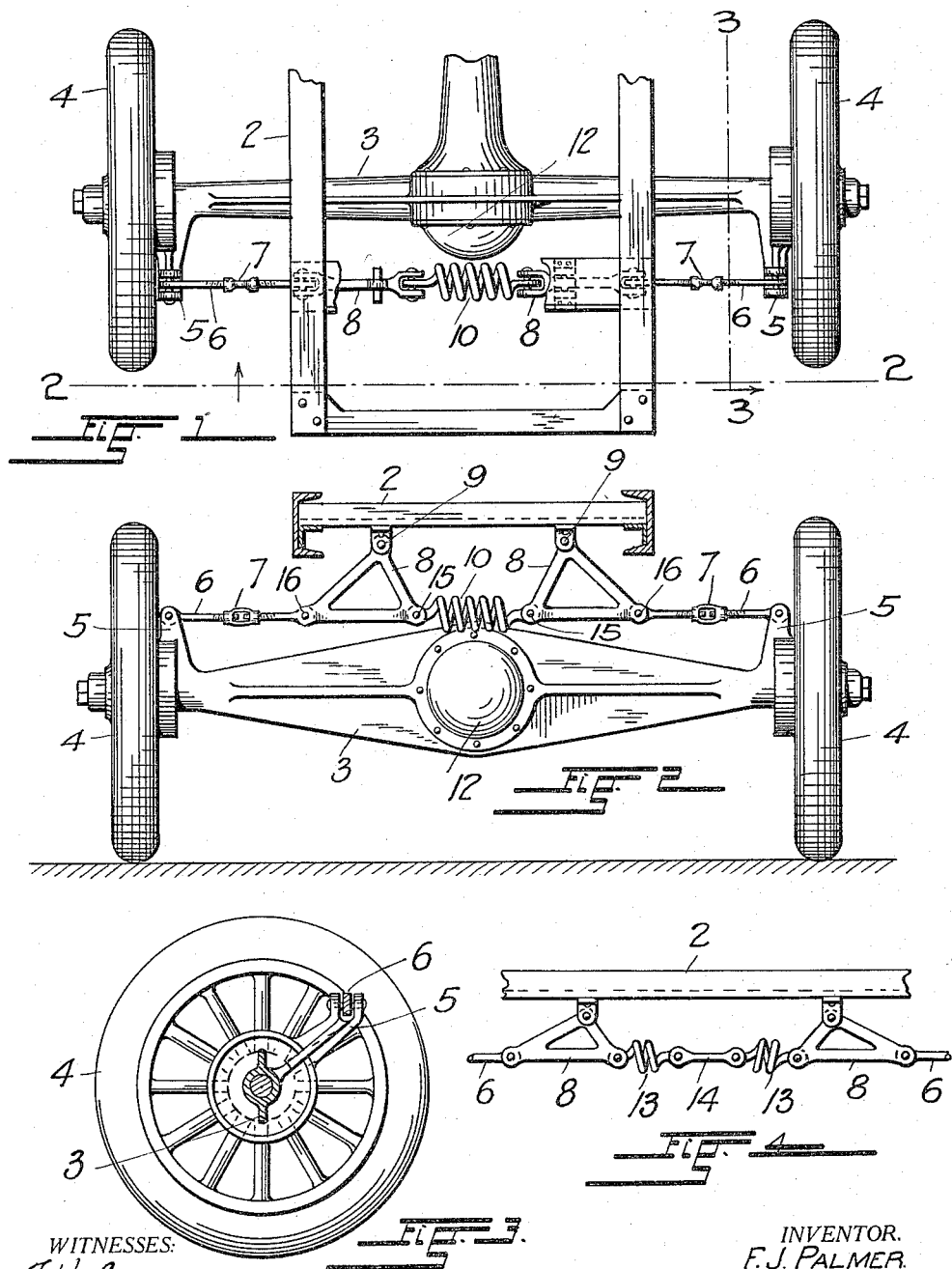

FREDERICK J. PALMER, OF DENVER, COLORADO.

VEHICLE-SPRING.

1,156,546.  Specification of Letters Patent.  Patented Oct. 12, 1915.

Application filed February 10, 1915. Serial No. 7,238.

*To all whom it may concern:*

Be it known that I, FREDERICK J. PALMER, a citizen of the United States, residing at Denver, in the county of Denver and State of Colorado, have invented certain new and useful Improvements in Vehicle-Springs, of which the following is a specification.

This invention relates to improvements in vehicle springs, and its object resides in the provision of a system of simple and durable coöperative parts by which the body of a vehicle is resiliently supported upon the axles of the same, and which while the vehicle is in motion, reduces the effects of road-shocks to a minimum.

Another object of my invention is to provide in a system of the character mentioned, a resilient element of economical construction which is associated with the other parts so that its tension can be varied at any time without detaching it from the vehicle, and so that if necessary, it may be readily removed and replaced by a spring of different size or strength.

With the above and other objects in view, all of which will fully appear in the course of the following description, my invention comprises in its preferred form, two complementary elements which are disposed at opposite sides of the longitudinal axis of the vehicle and which are connected by means of a coiled spring. Each of these elements consists of a transmission member which extends transversely with relation to the vehicle and which has a pivotal connection with the axle and a link connection with the body of the same.

The spring is disposed to yieldingly maintain the parts of the elements in their normal positions in which the body and the axle of the vehicle are parallel, and it resiliently resists the transmission of a movement of the axle to the body through the intermediary of the transmission members, when by obstructions on the road over which the vehicle is propelled, an axle and the body thereof are relatively displaced.

An embodiment of my invention in the form outlined above, has been illustrated in the accompanying drawings in the various views of which like parts are similarly designated, and in which, Figure 1 is a plan view of the rear axle of an automobile and the superposed portion of a body supported thereon by means of my improved spring system, Fig. 2, a section taken along the line 2—2, Fig. 1, Fig. 3, a transverse section along the line 3—3, Fig. 1, and Fig. 4, an elevation showing a modified construction of the spring.

Referring more specifically to the drawings, the reference numeral 2 designates the body of a vehicle, and 3 one of the axles of the same which at its ends is supported upon the road wheels 4.

The axle has at opposite sides of the longitudinal axis of the body, arms 5 which may be formed integrally with the axle as shown in the drawings or fixedly connected with the same by any suitable means.

The transmission members hereinbefore referred to, consist of rods 6 which extend transversely of the vehicle normally in substantially parallel relation to the axle, and which at their outer ends are pivotally connected with the arms 5. The rods are preferably composed of two parts connected by turn-buckles 7 by means of which they may be lengthened or shortened for the purpose of varying the tension of the spring of the system as will hereinafter be more fully described.

The rods are at their inner ends pivotally attached at the lower extremities of links 8 which have a pivotal connection with the vehicle body as at 9. A coiled spring 10 disposed between the links 8 is at its ends pivotally connected therewith whereby to provide a resilient connection between the complementary elements of the system thus positioned at opposite sides of the longitudinal axis of the vehicle.

The arms may extend slantingly from the vehicle as indicated in Fig. 3, to prevent the gear case 12 on the axle from interfering with the operation of the spring system, or the spring may for the same purpose, be composed of two parts 13 connected by a link 14 as shown in Fig. 4.

In the operation of my improved spring system, the normal tension of the spring maintains the parts of the two elements at opposite sides of the longitudinal axis of the vehicle, resiliently in their normal relative positions in which the body of the vehicle extends substantially parallel with relation to the axles of the same.

The points 15 and 16 at which the links are pivotally connected respectively with the ends of the spring 10 and with the inner ends of the rods 6 are at opposite sides of the vertical passing through the points 9 at which the links are suspended from the vehicle body, so that when the parts are connected as hereinabove described, the body is held against independent lateral displacement.

The links are preferably made in the form of triangular frames which adjacent the points of intersection of their sides are apertured to receive the bolts, pins or rivets by which the links are pivotally connected to the parts between which they are applied.

When by an obstruction on the road over which the vehicle is propelled, the axle 3 is raised bodily, the consequent movement of the points of connection between its arms 5 and the transmission member 6, in vertical lines, will through the intermediary of the transmission members, effect a movement of the links about the points at which they are connected with the vehicle body. The spring between the links which is in consequence expanded, tends to return the parts to their normal condition and absorbs the rebound when the axle and the body of the vehicle reassume their original relative positions. If but one of the wheels encounters an obstruction and the axle is displaced by moving about the point of contact of its other wheel with the road, the link at the upwardly moving side of the axle will initially move inwardly, and that at the opposite side of the same move outwardly, while during further upward motion of the axle, both links are by means of the transmission rods drawn apart. In either condition, the spring resiliently resists the transmission of movement of the axle to the vehicle body and absorbs the shocks incident to the return of the axle to its original position.

It will be observed that during upward displacement of the axle of any kind, the movements of the links increase in ratio to the decrease in distance between the axle and the vehicle body, and that at the initial point in the displacement of the axle, their movement is so slight as to be hardly perceptible. The result is that the vehicle body remains practically in its normal position during the slight up and downward movements of the axle under ordinary conditions while when the axle is displaced to a greater extent by obstructions or depressions encountered by one or both of its wheels, the mitigating action of the spring upon the vehicle-body increases proportionately. It will furthermore be observed that the spring 10 is expanded during the rebound of the axle as well as during its movement toward the vehicle body, so that it acts continually to mitigate and absorb the shocks on the vehicle body due to the displacement of the axle with relation thereto.

The tension of the spring may be varied by adjustment of the turn-buckles 7 even while the vehicle is loaded, or the spring may be replaced by one of different size or strength, in case the weight of a load to be carried on the vehicle demands a change in the degree of resiliency of the yielding connection between the complementary elements of the system.

Having thus described my spring-system in its preferred form, I desire it understood that the construction and relative arrangement of its parts, may be varied within the spirit of my invention as defined in the following claims:

1. In combination with a vehicle, two complementary elements at opposite sides of the longitudinal axis thereof, each comprising a transmission member having a pivotal connection with an axle of the vehicle, and a link having three points for connection, at two of which it is pivotally attached respectively to the said member and to the vehicle body, and a spring attached to the links of the said elements at the third point of the same.

2. In combination with a vehicle, two complementary elements at opposite sides of the longitudinal axis thereof, each comprising a transmission member having a pivotal connection with an axle of the vehicle and a link pivotally suspended from the vehicle body and connected with the member at one side of the vertical passing through its point of suspension, and a spring connected with the links of the said elements at points at the sides of their said verticals opposite to those at which the transmission members are connected.

3. In combination with a vehicle, two complementary elements on opposite sides of the longitudinal axis thereof, each comprising a link pivoted to the vehicle body, an arm extending laterally from an axle of the vehicle, and a transmission member pivotally connected at one of its ends to the said link and at its opposite end to the said arm, and resilient means yieldingly maintaining said elements in their normal condition in which they support the vehicle body in substantially parallel relation to the said vehicle-axle.

4. In combination with a vehicle, two complementary elements on opposite sides of the longitudinal axis thereof, each comprising a link pivoted to the vehicle body, an arm extending laterally from an axle of the vehicle, and a transmission member pivotally connected at one of its ends to the said link and at its opposite end to the said arm, and a spring connecting said elements at points normally in a plane with the points of connection of the transmission members with the respective arm and link.

5. In combination with a vehicle, two complementary elements on opposite sides of the longitudinal axis thereof, each comprising a link pivoted to the vehicle body, an arm extending laterally from an axle of the vehicle, and a transmission member pivotally connected at one of its ends to the said link and at its opposite end to the said arm, and resilient means yieldingly maintaining said elements in their normal condition in which the points of connection of the transmission elements with the respective arm and link are in a plane substantially parallel to the axis of the said axle.

6. In combination with a vehicle, two complementary elements on opposite sides of the longitudinal axis thereof, each comprising a link pivoted to the vehicle body, an arm extending laterally from an axle of the vehicle, and a transmission member pivotally connected to the said arm and to the link at a point out of vertical alinement with its point of connection with the vehicle body, and resilient means yieldingly maintaining said elements in their normal condition in which the said points of connection of the transmission elements with the respective arm and link are in a plane substantially parallel to the axis of the said axle.

7. In combination with a vehicle, two complementary elements on opposite sides of the longitudinal axis thereof, each comprising a link pivoted to the vehicle body, an arm extending laterally from an axle of the vehicle, and a transmission member pivotally connected to the said arm and to the link at a point out of vertical alinement with its point of connection with the vehicle body, and a spring connecting said elements at points normally in a plane with the points of connection of the transmission elements with the respective arm and link.

8. In combination with a vehicle, two complementary elements on opposite sides of the longitudinal axis thereof, each comprising a link pivoted to the vehicle body, an arm extending laterally from an axle of the vehicle, and a transmission member pivotally connected to the said arm and to the link at a point out of vertical alinement with its point of connection with the vehicle body, and a spring connecting said links.

9. In combination with a vehicle, two complementary elements on opposite sides of the longitudinal axis thereof, each comprising a link pivoted to the vehicle body, an arm extending laterally from an axle of the vehicle, and a transmission member pivotally connected at one of its ends to the said link and at its opposite end to the said arm, and a spring connecting said links and normally maintaining the elements in a condition in which they support the vehicle body in substantially parallel relation to the axle of the vehicle.

10. In combination with a vehicle, a link pivotally connected with the body thereof, an arm extending laterally from an axle of the same, a transmission member pivotally connected at one of its ends to the said arm and at its opposite end to the said link, and a spring connected with the link and yieldingly maintaining the parts in their normal condition in which the points of connection of the transmission member with the arm and the link are in a plane substantially parallel to the axis of the axle.

11. In combination with a vehicle, two complementary elements at opposite sides of the longitudinal axis thereof, each comprising a link pivotally suspended from the vehicle-body, an arm extending laterally from an axle of the vehicle, and a transmission member pivotally connected with the said arm and with the said link at a point at one side of the vertical passing through its point of suspension, and resilient means connected with said links at points at the sides of their said verticals opposite to those at which the transmission members are connected, and maintaining the elements in their normal condition in which the points of connection of the transmission elements with the respective link and arm are in a plane substantially parallel to the axis of the axle.

In testimony whereof I have affixed my signature in presence of two witnesses.

FREDERICK J. PALMER.

Witnesses:
G. J. ROLLANDET,
L. RHOADES.

Copies of this patent may be obtained for five cents each, by addressing the "Commissioner of Patents, Washington, D. C."